Jan. 10, 1950  D. E. SUNSTEIN  2,494,369
TUBE TESTING CIRCUIT
Filed Feb. 14, 1945
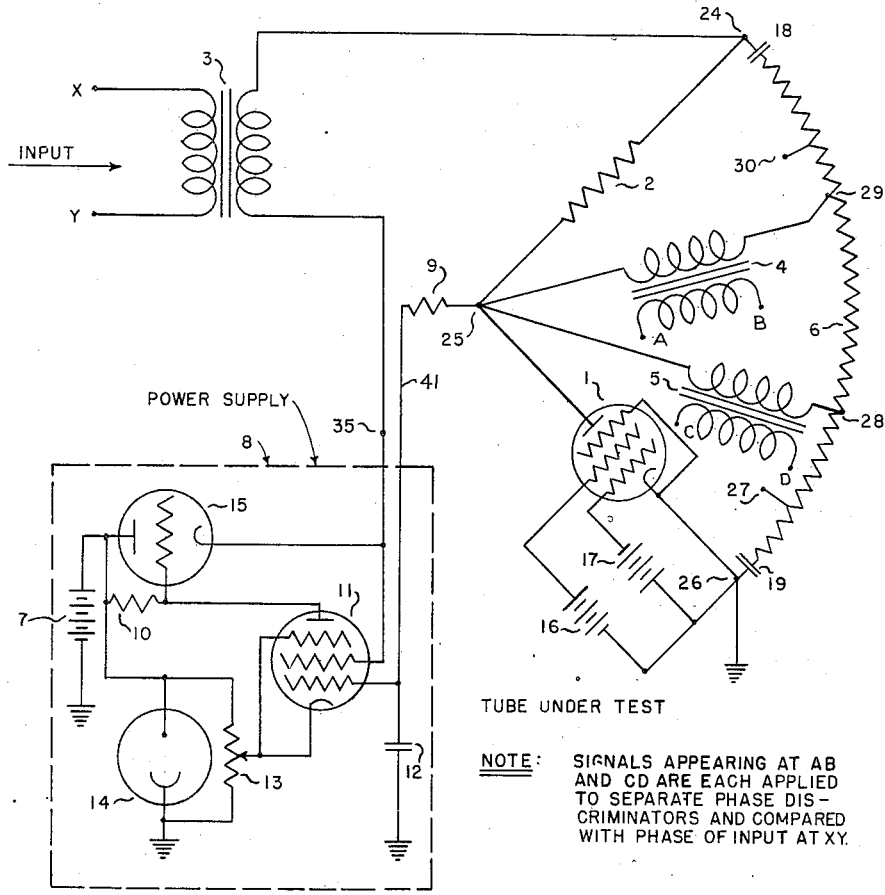
NOTE: SIGNALS APPEARING AT AB AND CD ARE EACH APPLIED TO SEPARATE PHASE DISCRIMINATORS AND COMPARED WITH PHASE OF INPUT AT XY.
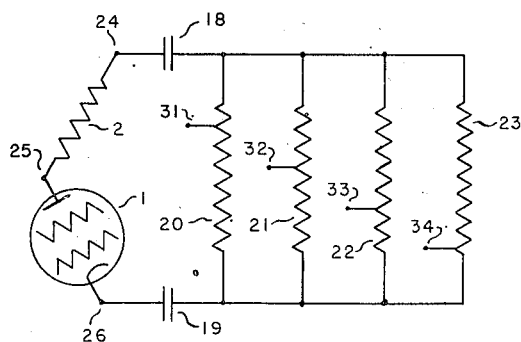
DAVID E. SUNSTEIN, INVENTOR.

Patented Jan. 10, 1950

2,494,369

UNITED STATES PATENT OFFICE 2,494,369

TUBE TESTING CIRCUIT

David E. Sunstein, Elkins Park, Pa., assignor to Philco Corporation, Philadelphia, Pa., a corporation of Pennsylvania Application February 14, 1945, Serial No. 577,833

3 Claims. (Cl. 315—368)

My invention relates to automatic testing procedure and to methods and apparatus for measuring the values of impedances whose value changes with the applied voltage. Such impedances are known as non-linear impedances. In particular, it relates to a method for the automatic testing of the anode resistance of thermionic vacuum tubes.

The anode resistance of a thermionic vacuum tube is defined as the variation in anode voltage necessary to cause a certain standard variation in anode current under the condition that the potentials on all of the grids in the tube are held constant.

The customary standard measurement of variation in anode current is in milli-amperes. The anode resistance of a thermionic tube may be defined as the ratio of a small change in anode voltage to the corresponding small change in anode current under the condition that the grid potentials of the tube are held constant at cathode potential, or at some other D. C. potential.

Various means are available for making such tests. Many of these are Wheatstone bridge circuits. Each of these circuits however, must be adjusted in order to accomplish the desired test, because in these circuits no fixed potential appears at the anode of the tube. Furthermore, it is common knowledge that the anode resistance of a thermionic tube depends upon the anode potential and also on the potentials of the various grids.

The usual method for measuring the anode resistance of such a tube in a Wheatstone bridge circuit causes a variation of the anode potential of the tube with variations of anode current. Consequently a series of supposedly similar tubes tested in such a circuit may not give good results, because of the variation of anode resistance with variation of anode potential.

It is the purpose of this invention to automatically control the anode potential on each tube tested at a predetermined value, and at the same time to arrange the circuit so that it is usable for automatic test means, as a go or no-go indicator or actuator.

In accomplishing this automatic anode voltage regulation, the voltage across the anode of the tube is fed into the control point of a regulated power supply. This regulated power supply is used to supply D. C. current to the tube through the rest of the impedance bridge.

This then accomplishes one primary purpose of the invention: to regulate the voltage across the anode to cathode of the tube under test and to do it in such a manner that no extraneous circuit elements are introduced which would spoil the bridge as a method of measuring the anode resistance.

The details of one form of my invention can best be understood by reference to certain diagrams. In these diagrams:

Figure 1 represents the diagram of the whole system composed of impedance bridge, regulated power supply, input and output transformers.

Figure 2 shows another form of the impedance bridge circuit which may under certain circumstances have advantages over the form shown in Figure 1.

Referring to Figure 1, the tube under test 1 is one arm of the impedance bridge. Bias potentials may be supplied to the control grid and the screen grid through batteries 16 and 17. It is to be observed that in this circuit the cathode and these bias batteries are all at ground potential; that is, the potential of terminal 26. If it is desired to do so, these batteries can be by-passed with condensers to make certain that their impedance is low at the frequency at which the bridge is being operated. Likewise, these batteries can be replaced by regulated power supplies which would furnish the necessary potentials to the grids of the tube.

A standard resistor 2 composes another arm of the impedance bridge. D. C. current for the operation of the tube is supplied from the power supply 8, through the secondary of the input transformer 3, into junction 24, on the impedance bridge, through standard resistor 2 to junction 25, and then through the tube 1 to ground. The other pair of arms of the impedance bridge are formed from resistor 6, in conjunction with capacitors 18 and 19. These capacitors are primarily blocks to prevent direct current from flowing through the output transformers 4 and 5. The reactance of these condensers at the frequency of use at the bridge is preferably considerably smaller than any part of resistor 6 which is used as a part of the bridge circuit.

For example, when output transformer 4 is used, the part of resistor 6 from the capacitor 18 to junction 29 composes one arm of the bridge. Likewise, the part of resistor 6 from junction 29 to capacitor 19 forms the fourth arm of the impedance bridge. When output transformer 5 is used however, junction point 28 forms the dividing point on resistor 6 between the two arms of the bridge. Thus, the part of resistor 6 from capacitor 18 to junction 28 constitutes one arm of the bridge and the resistance from junction 28 to capacitor 19 constitutes another arm of the bridge. As the circuit has been drawn, then, the equivalent of two bridges is in effect set up. Two other junction points 27 and 30 are also shown, and it is possible to connect extra transformers from these junction points to junction 25. If this were done, there would then be four different bridges in one.

The functioning of any one of these bridges is standard. The common equations used in an impedance bridge are operative, providing the primary impedance of transformers 4 and 5 is negligibly great compared to the impedance in the arms of the bridge. Thus, when junction 29 is being used, that is, when output transformer 4 is being used, the resistance of the tube under test which causes zero signal in transformer 4, is given as the value of the standard resistance 2 multiplied by that part of resistor 6 which occurs between junction 29 and capacitor 19, divided by that part of resistor 6 which occurs between junction 29 and capacitor 18. Thus it is seen that the position of junction 29 relative to the complete resistance of the resistor 6 determines the ratio between the standard resistor and the resistance of the tube under test. Tap 28 could, for example, be a minus 5% tap, and junction 29 could be a plus 5% tap.

Under these circumstances, the resistance from junction 29 to capacitor 18 would be chosen as 48.8% approximately of the total value of resistor 6, and the part of resistor 6 between junction 29 and capacitor 19 would then be 51.2%. The ratio of these two figures, that is, the ratio of 51.2 to 48.8 is 1.05; which is a 5% increase above a ratio of unity. Thus, if the tube were 5% higher in resistance than the standard resistor 2, the bridge would balance when transformer 4 were used as the output transformer.

If the tube were of too low a resistance, the output of transformer 4 would have one phase, and if the tube were too high in resistance, that is, higher than 5% above the standard, the output of transformer 4 would have the opposite phase to what it had before. Consequently, the output of transformer 4 can, after it has been amplified, be fed into a phase sensitive detector, such as disclosed and described in my co-pending application Serial No. 576,095 filed February 3, 1945, now abandoned, for improvements in an Electrical system.

The phase detector as described in the above mentioned application gives an indication of the relative phase (that is, in phase or out of phase relationship) between the signal applied thereto by transformer 4 and the signal applied thereto by the input signal supplying transformer 3. Alternatively the phase detector as described may actuate relays or solenoids in accordance with the signals fed thereto.

Thus the phase detector indicates whether the tube in test is too high or too low compared to the 5% tolerance given at tap 29. Likewise tap 28 can be arranged as a 5% low tolerance by feeding transformer 5 into a second phase sensitive detector. Then it is evident that if the tube is too low as measured on tap 29, and too high as measured on tap 28, it comes within plus or minus 5% of the standard value inserted as resistor 2.

If it were desired to have a further extension of tolerance limits, junction 27 and 30 could be used; possibly these could be used for a plus or minus 10% tolerance. Then it would be possible to quickly determine whether the vacuum tube under test fell within the plus or minus 10% tolerance, or within the plus or minus 5% tolerance, and also whether it was between plus 5% and plus 10% or between minus 5% and minus 10%, or whether it was outside all of the tolerance ranges. Thus a convenient and accurate go or no-go limit test is provided.

It will be noted that it is possible with this type of circuit to test various types of tubes. Tubes with different values of standard anode resistance can thus be tested simply by removing standard resistor 2, and replacing it with a standard which is appropriate for the tube under test. This can be done then without changing any of the taps on resistor 6. Consequently this type of circuit could be used for testing a wide variety of vacuum tubes for anode resistance. All that would be necessary to do would be to select the proper standard resistance, that is, the resistance which is to be the standard which should be met by all the tubes under test. This standard value is placed in arm 2 of the bridge. If desired, particularly for the measurement of anode resistance of pentode tubes, the standard resistor 2 may have a resistance which is but a fraction of the nominal anode resistance of the tube under test. In this case, the resistors comprising resistance 6 are modified accordingly, as can be understood from the previously described operation principles. The bridge then will automatically determine whether or not a tube placed in the circuit arm as tube #1 is within the tolerance specified by the various taps on resistor 6.

One thing remains to be taken care of as far as the detailed operation of this bridge is concerned. That is, the input impedance to the output transformers should preferably be quite high compared to any of the resistances which are to be used in the various arms of the bridge. Normally this would not be a difficult condition to meet, particularly if the bridge were to be operated at a relatively high audio-frequency. It is quite possible under these circumstances to have resistors of the order of hundreds or thousands of ohms in the arms of the bridge, and to have the input impedance of the transformers used be of the order of megohms or tens of megohms. This condition is particularly true when testing triodes. When testing pentodes, where the anode resistance may run to the order of megohms or more, this condition may be a more difficult one to achieve; although with proper care and good design it is possible to raise the impedance of the transformers 4 and 5 so that little trouble will be experienced from this circumstance. However, under certain conditions, it may prove more feasible to employ transformers with primary impedances which are not negligibly high. Under such circumstances, the primary impedances may be taken into account in establishing the proper values of the impedance arms in the right hand half of the bridge to result in balance conditions at the desired limits or tolerances.

The system of feeding power to this Wheatstone bridge is an essential part of this invention. It is to be observed that power is fed to this bridge in two ways; first, D. C. power is fed through the regulated power supply; and second, A. C. power is fed, as through input transformer 3. The A. C. power, of course, is the signal which is used to operate the bridge as an impedance bridge or Wheatstone bridge.

The regulated power supply is the essential feature of the supply of direct current to the bridge. This power supply is of a fairly standard form. The main supply comes from battery #7, which may also be a standard rectifier filter combination, as is common in radio practice. The regulating tube is tube #11 which operates in various manners.

Essentially this tube controls the voltage drop across tube 15 in such a manner that the variation in voltage at the control point for tube 11 remains unchanged, that is, so that there is very little variation in voltage at the control point 41 of tube 11.

The voltage regulator tube 14 which is a cold cathode discharge tube with constant voltage drop, is the tube which controls the absolute level of voltage. Across this tube resistor 13 makes it possible to choose any one of several constant voltages as the control level. The tap on resistor 13 controls the cathode potential of tube 11. The grid potential of tube 11 is controlled through resistor 9 from tap 25 on the impedance bridge. This tap is the anode potential tap on the tube 1 under test.

Under the condition of stable operation, the voltage at tap 25 is such that there is relatively small voltage between the grid and cathode of tube 11. This voltage is just sufficient to cause an anode current to flow in tube 11 through anode resistor 10 such that the grid potential of tube 15 is correct to cause a certain current to flow through tube 15. This current flowing through tube 15, through the secondary transformer 3, through standard resistor 2 and to the tube under test 1 to ground, and back through the regulated power supply, is just the right current to cause the initially assumed voltage drop across tube 1.

However, suppose tube 1 should be removed, and a tube which for this current would give a higher voltage drop were inserted in place of it; then the voltage on the anode would rise. Consequently the voltage on the grid of tube 11 would rise correspondingly. This would increase the current through the tube 11 and through resistor 10. This would lower the grid potential of tube 15 causing a reduction of current therethrough. This reduction in current would be sufficient to cause a reduction in voltage across tube 1. This reduction in current and consequently reduction in voltage across tube 1, would continue until the grid voltage on tube 11 were only slightly higher than it had been before.

Now, since it only takes a few volts on tube 11 to complete the excursion of the tube from cut-off to full anode current flowing, a small change in the voltage across tube 1 will give a very large change in the current flowing through tube 15, and out through the circuit. Consequently this circuit tends to keep the voltage across tube 1 constant. In actuality, it may vary by a volt or so over the whole range of possible tubes that might be inserted for tube 1; but this is ordinarily not a sufficiently great variation in anode voltage to cause any trouble. If it is desired to change the actual value of anode voltage on tube 1, all that is necessary is to change the position of the tap on resistor 13. The voltage of the anode of tube 1 will automatically follow this in order that the grid potential of tube 11 shall follow the cathode potential.

It is to be noted also that alternating current from the bridge would be fed into the grid of tube 11 were it not for the presence of the capacitor 12 and resistor 9, which act as a filter combination. This is desirable for satisfactory operation of the regulated power supply. Otherwise an A. C. signal would also be applied to the grid of tube 11 and various difficulties might arise, such as variation of output voltage of the regulated power supply. Resistor 9 should preferably be quite large compared to any of the resistors in the circuit being used for the impedance bridge. In particular, resistor 9 should preferably be large compared to the anode resistance of the tube under test.

It now will be observed that it is possible to record at the same time that the test is being made the value of the anode current in the tube under test. This regulated power supply provides constant anode potential. Thus, for various tubes it might be expected that the anode current would vary because of manufacturing variations in the tube structure itself. This current could be read by the insertion of a milliameter in series with the circuit from the regulated power supply at junction 35 for example. Likewise, this current could be read by the voltage developed between ground and junction 35. These measurements could, of course, be applied to limit techniques, so that automatically there could be determined whether or not the D. C. current for the tube was within the proper limits.

Another method of arranging the circuit is shown in Figure 2, which shows just the impedance bridge part of the circuit. In this circuit each one of the limit ranges is determined by a separate pair of resistors, or stated otherwise, by a separate tapped resistor. Thus, for example, the limit corresponding to tap 29 in Figure 1 is obtained in this circuit by resistor 21 with a tap 32. Likewise, the limit corresponding to tap 28 in the previous diagram is here determined by resistor 22 with tap 33. The limit corresponding to tap 27 is determined by resistor 23 with tap 34, and the limit corresponding to limit 30 is obtained by resistor 20 with tap 31. Two advantages accrue from this method of determining the limit resistances. One advantage is that each limit is independently determined from the other limits. Thus it is possible to set a limit of plus 5% using resistor 21 with tap 32, and then to independently set a limit of minus 5% using resistor 22 with tap 33. This makes the adjustment of the individual limits considerably easier than it would be in Figure 1 where each limit depends upon the other limit to a certain extent.

Thus, for example, if in Figure 1 the resistance between tap 29 and 30 becomes damaged, every one of the limits in the whole system would be wrong. But in Figure 2 if resistor 21 should become damaged, only the limit set by tap 32 is in error. All of the other limits remain as they should be, thus servicing on the circuit of Figure 2 should be easier than the servicing on the circuit of Figure 1.

Another advantage of Figure 2 is that the transformer used for the output transformers are not so critical since each transformer is connected to a different circuit on the right-hand side. The application of the regulated power supply to this circuit is the same as described above.

It will now be clear that with the circuit arrangements of the present invention, measurements may be made of the anode resistance of vacuum tubes under a condition of constant anode voltage, though the current drawn by the individual tubes should change.

It will, moreover, be understood that while I have illustrated my invention as applied to vacuum tubes, it is equally applicable for measuring the impedance of any electrical device whose impedance value changes with voltage. Thus, for example, the tube 1 may be replaced by an unknown such as a neon lamp or thermistor, or a block of thyrite where impedance measurements of such devices are to be made.

Accordingly I prefer to have my invention limited only by the following claims.

I claim:

1. In a system for measuring the anode resistance of a vacuum tube having an anode, grid and grounded cathode, a bridge circuit, the plate cathode circuit of said tube under test comprising one branch of said bridge, means for biasing the grid of said tube, a grounded source of power for said bridge, and means controlled by the potential on the anode of the tube being measured for controlling the output of the source of power and maintaining the anode potential of the tube under test constant.

2. In a system for measuring the anode resistance of a vacuum tube having an anode, grid and grounded cathode, a bridge circuit, the plate cathode circuit of said tube under test comprising one branch of said bridge, a standard resistor comprising an adjacent branch of said bridge, a resistor having a plurality of junctions in the remaining branches of the bridge, a grounded source of power for said bridge, and electron tube means for controlling the output of the source of power and maintaining the average anode potential of the tube under test constant.

3. In a system for measuring anode resistance of a tube, a Wheatstone bridge, said tube forming one branch of said bridge, a standard resistance forming another branch of said bridge, a pair of resistances forming the other two branches of said bridge, each of said pair of resistances having condensers connected in series therewith in each branch, a source of alternating current comprising a transformer, a source of regulated direct current supply connected in series with said source of alternating current, circuit means including a first electron tube operated in accordance with the potential drop across said tube being measured and a second electron tube controlled by said first electron tube for supplying a fixed anode potential to said tube and for applying a superimposed variable potential to said anode from said source of alternating current, the impedance of said condensers at the frequency at which the bridge is operated being considerably smaller than that of the said pair of resistances.

DAVID E. SUNSTEIN.

REFERENCES CITED

The following references are of record in the file of this patent:

UNITED STATES PATENTS

| Number | Name | Date |
|---|---|---|
| 1,989,394 | Aull | Jan. 29, 1935 |

OTHER REFERENCES

"Theory and Application of Vacuum Tube," by Herbert J. Reich (page 333).

"Radio Engineers Handbook," by Frederic G. Terman, 1943 (page 960).

"High Frequency Measurements," by A. Hund, 1933, page 333; published by McGraw-Hill Book Co., New York, N. Y.